July 7, 1936.  I. H. JUDD  2,046,561
RUNNING GEAR ASSEMBLY
Filed June 3, 1935    5 Sheets-Sheet 3
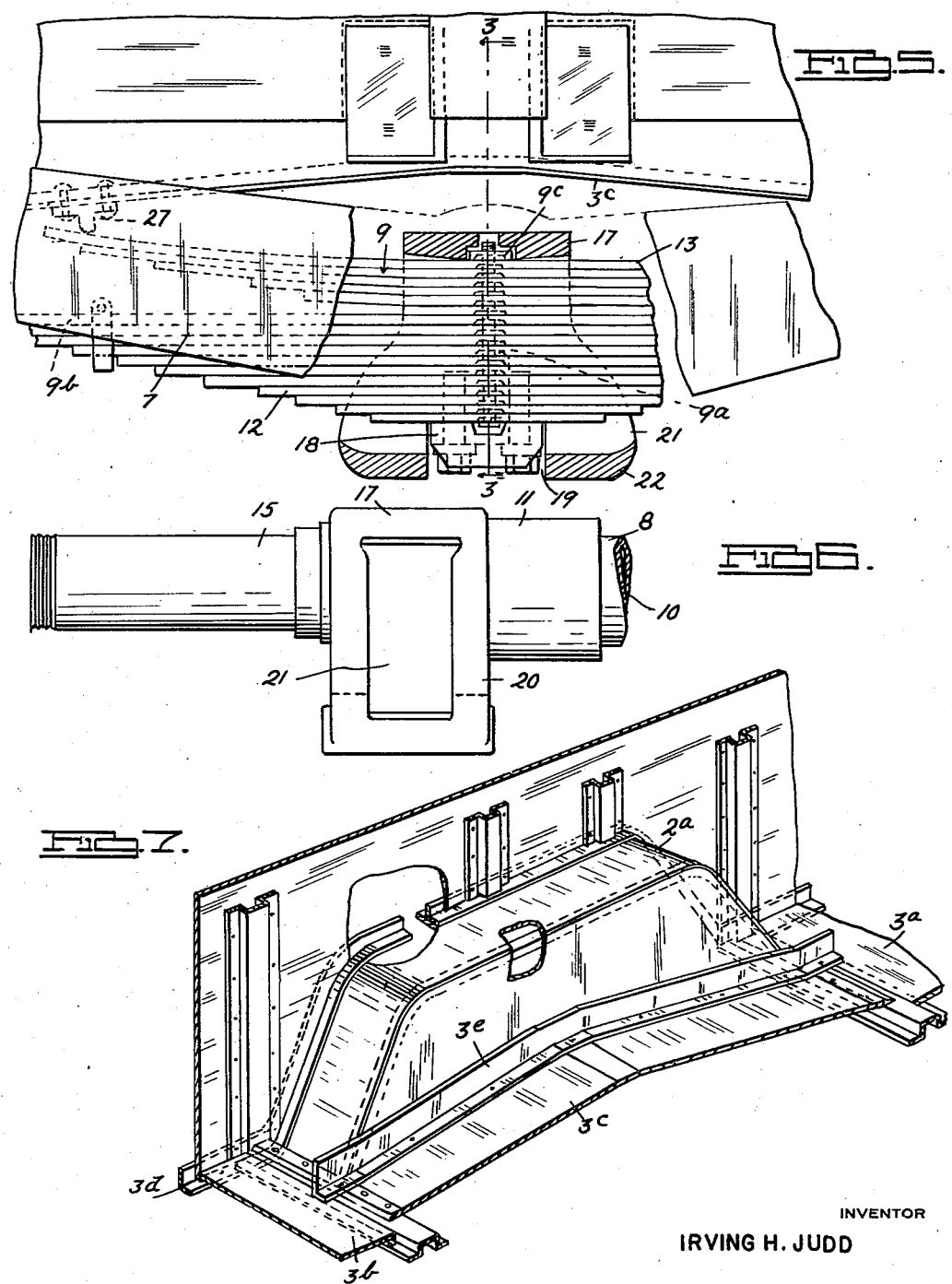
INVENTOR
IRVING H. JUDD
BY
ATTORNEYS July 7, 1936.  I. H. JUDD  2,046,561
RUNNING GEAR ASSEMBLY
Filed June 3, 1935   5 Sheets-Sheet 4
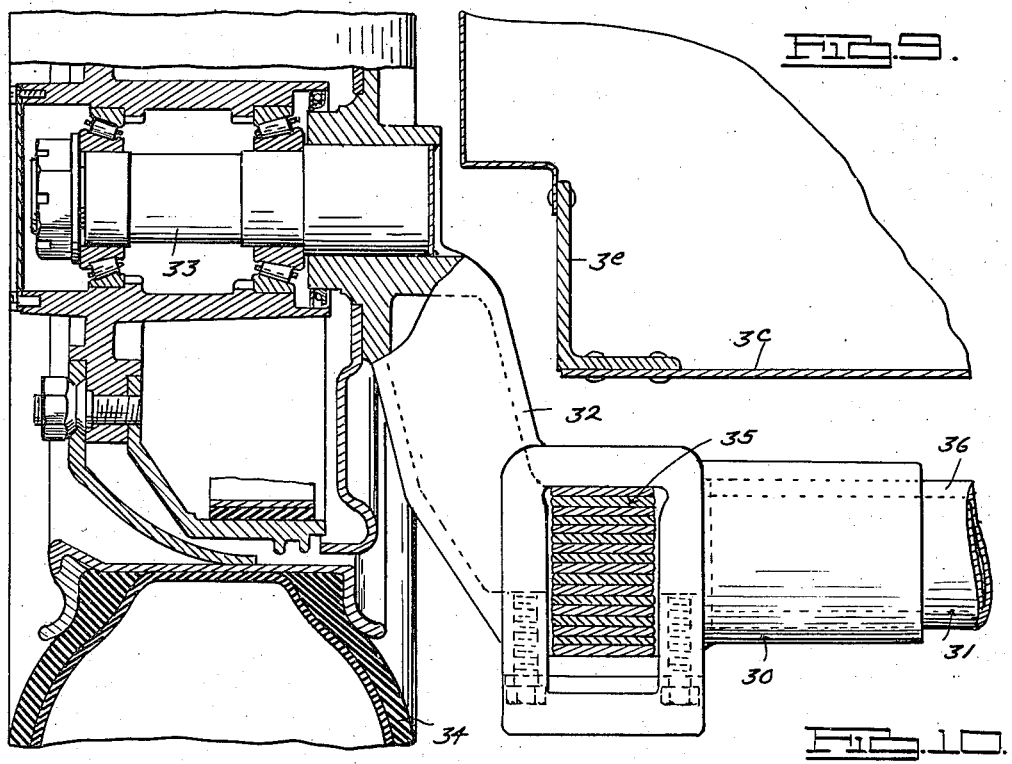
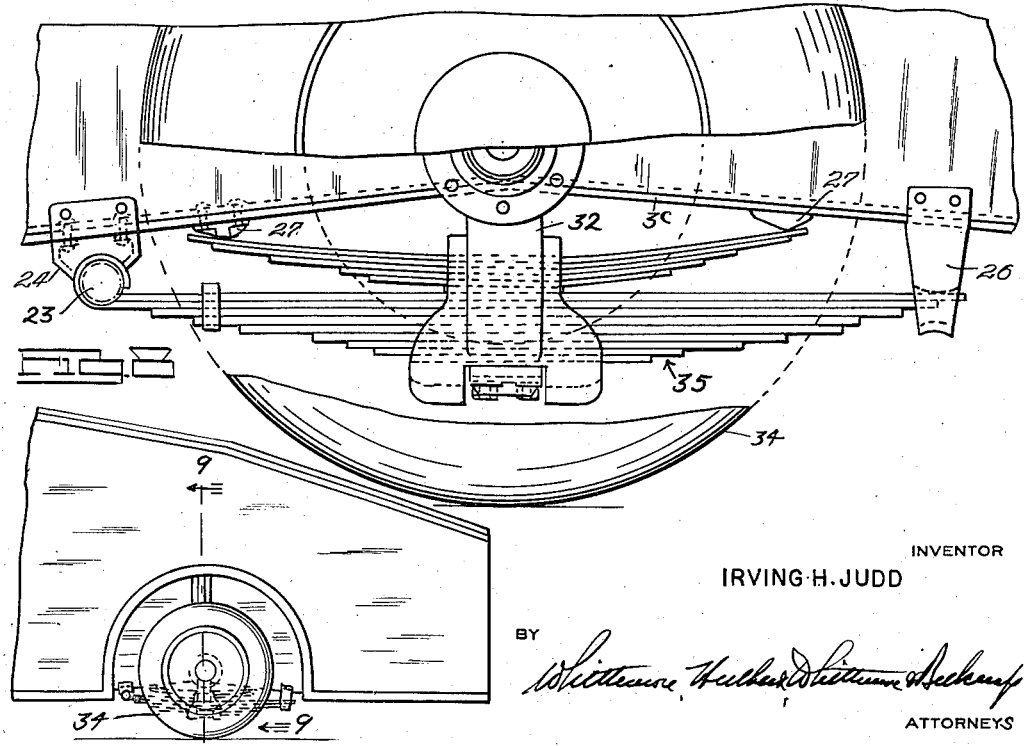
INVENTOR
IRVING H. JUDD
ATTORNEYS

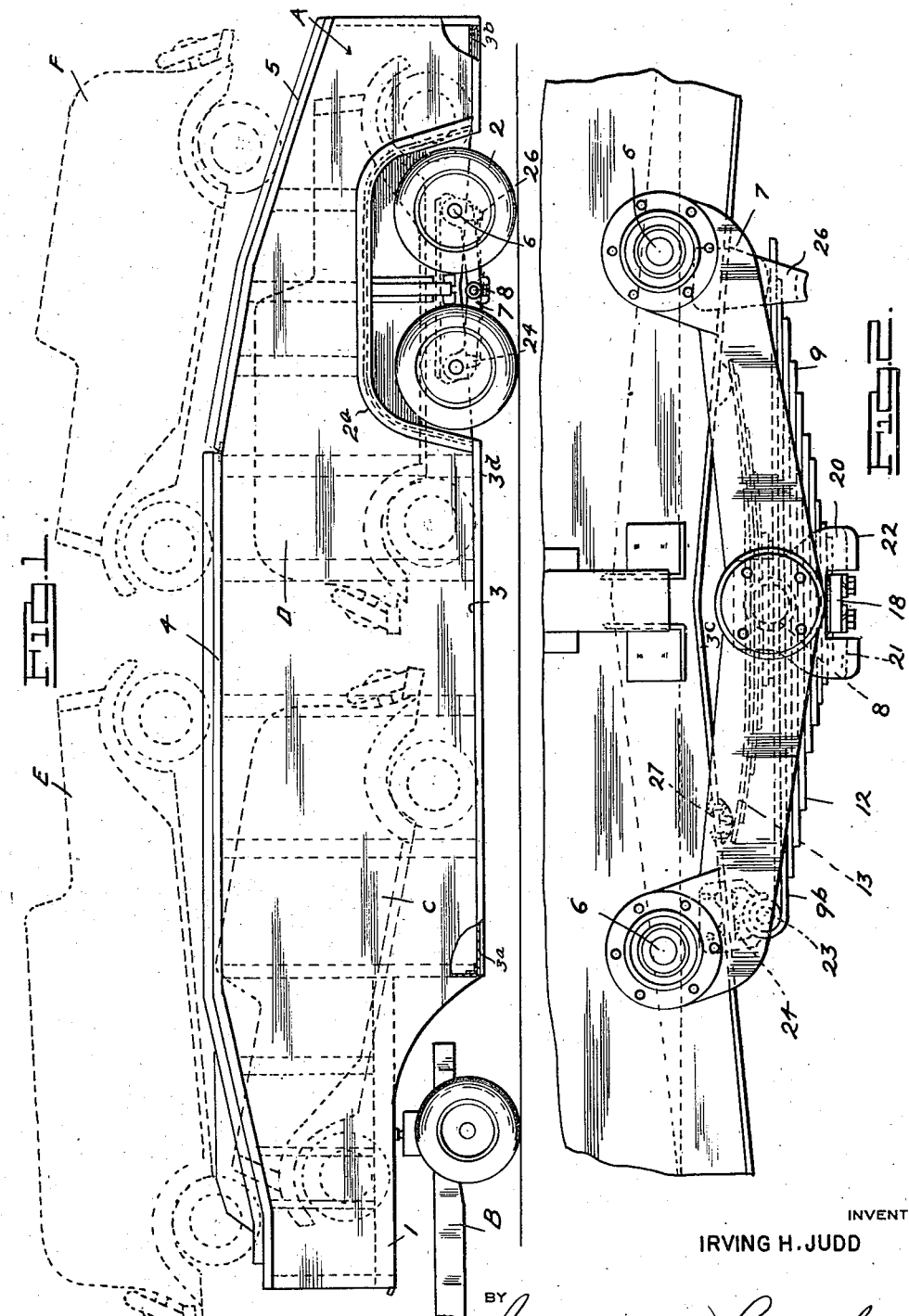

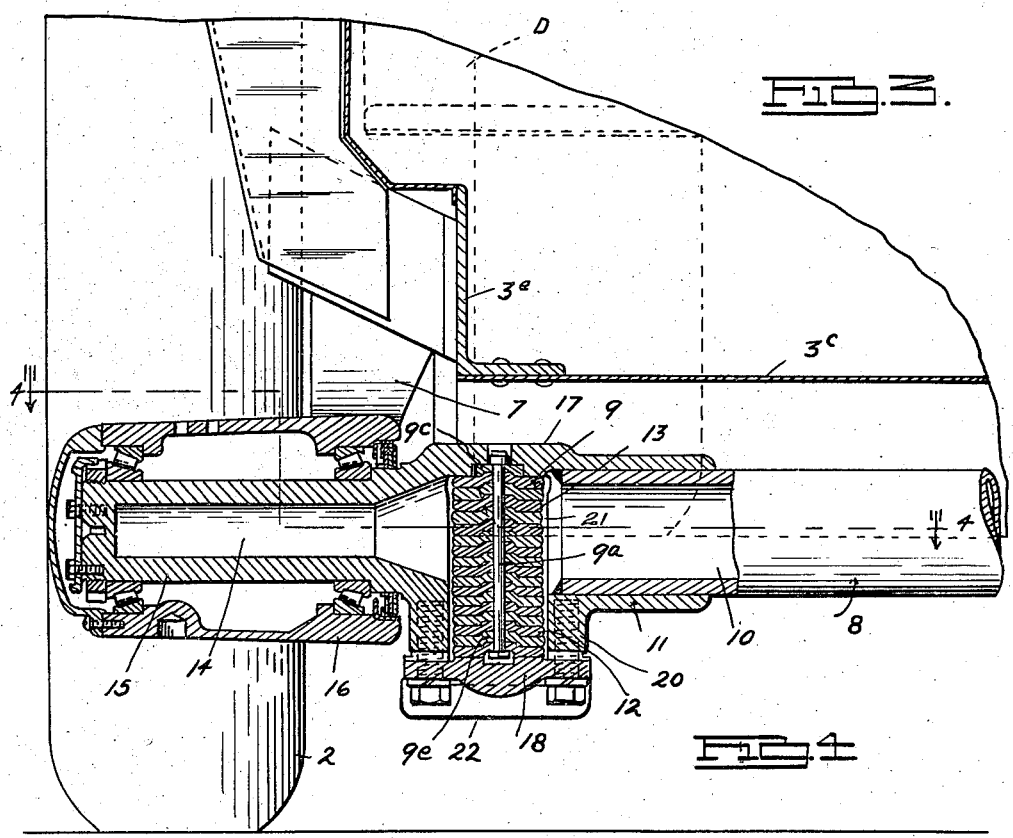
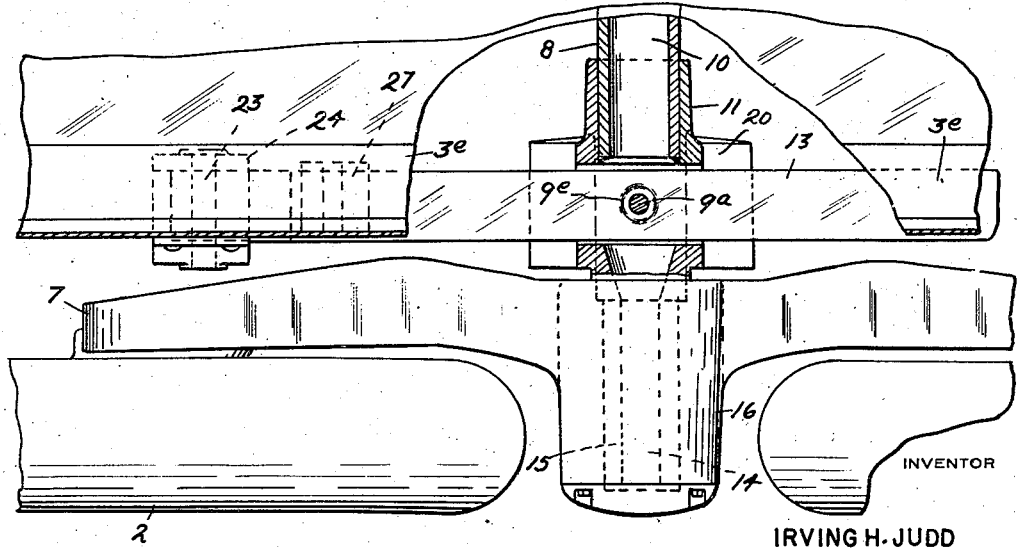

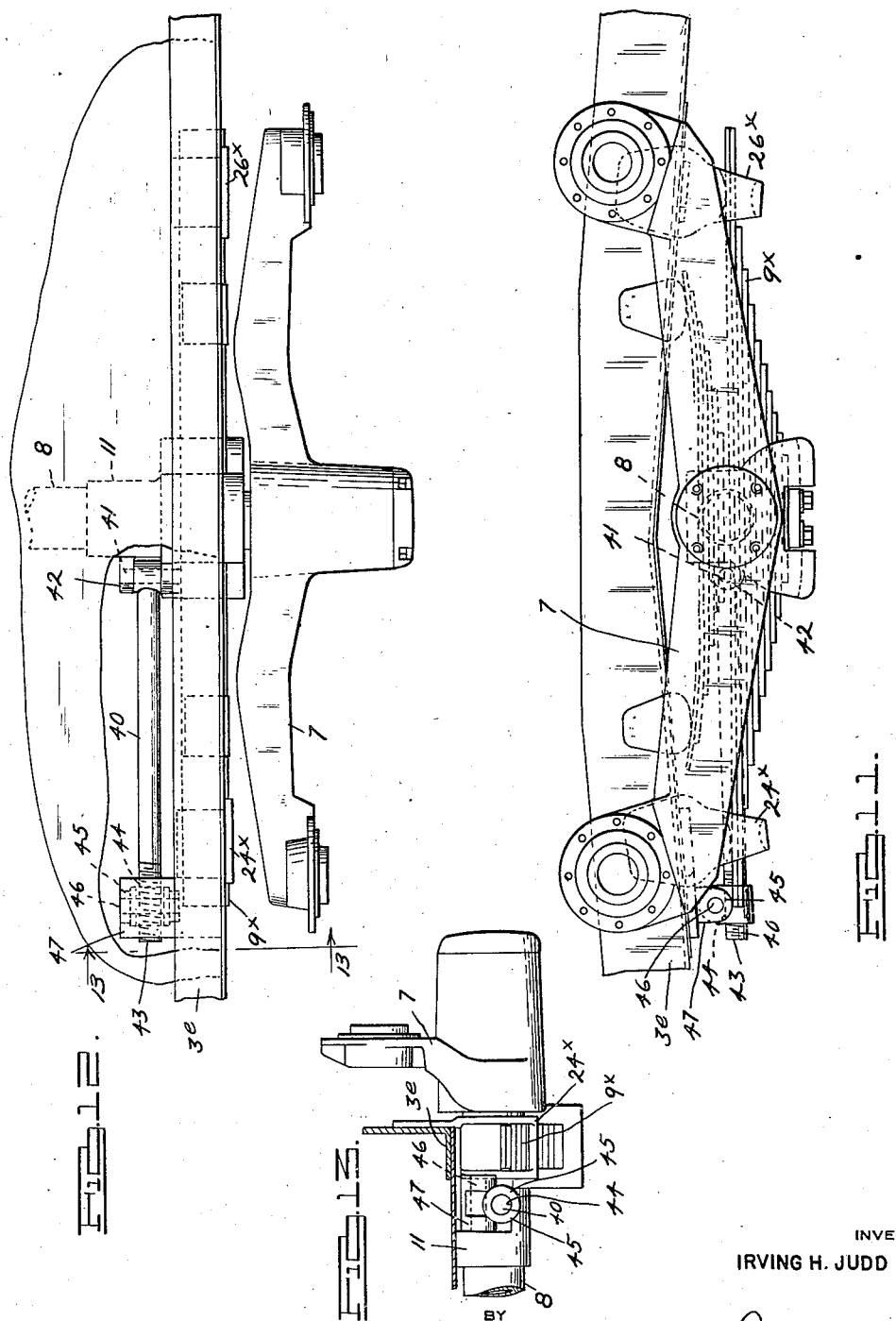

Patented July 7, 1936

2,046,561

UNITED STATES PATENT OFFICE 2,046,561

RUNNING GEAR ASSEMBLY

Irving H. Judd, Dearborn, Mich., assignor to Whitehead & Kales Company, River Rouge, Mich., a corporation of Michigan Application June 3, 1935, Serial No. 24,738

6 Claims. (Cl. 267—52)

This invention relates generally to running gear assemblies for vehicles and refers more particularly to an improved spring suspension for a two-deck four-car carrying trailer.

One of the essential objects of the invention is to provide a spring suspension of the type mentioned that will support the lower load carrying deck of the trailer lower to the ground, preferably in a substantially horizontal plane between the axis of the axle and the axes of the ground-engaging wheels of the trailer, so that the over-all height of such trailer may be at a minimum and the loading and unloading thereof will be easier.

Another object is to provide a spring suspension which is so constructed and arranged with respect to the lower deck of the trailer that an automobile may be loaded upon said deck between the ground-engaging wheels when the over-all width of the trailer is within the statutory limits of eight feet.

Another object is to provide a spring suspension having an improved radius rod construction to provide an easier, finer and absolutely positive adjustment for axial alignment.

Other objects, advantages and novel details of construction of this invention will be made more apparent as this description proceeds, especially when considered in connection with the accompanying drawings, wherein:

Figure 1 is a side elevation of a trailer having a running gear embodying my invention, showing a fragmentary elevation of a truck supporting the forward end of the trailer, and showing by dotted lines the positions of automobiles when loaded upon said trailer;

Figure 2 is an enlarged fragmentary elevation of the running gear and associated parts;

Figure 3 is a sectional view taken substantially on the line 3—3 of Figure 5;

Figure 4 is a sectional view taken substantially on the line 4—4 of Figure 3 and showing parts broken away;

Figure 5 is an enlarged fragmentary elevation of the running gear and associated parts with parts broken away and in section;

Figure 6 is an enlarged fragmentary elevation of the transversely extending axle;

Figure 7 is a fragmentary perspective view of the trailer with parts broken away and in section;

Figure 8 is a fragmentary side elevation of a slight modification;

Figure 9 is a sectional view taken substantially on the line 9—9 of Figure 8;

Figure 10 is an enlarged fragmentary side elevation of the running gear illustrated in Figure 8 with parts broken away;

Figure 11 is a side elevation of another modification;

Figure 12 is a top plan view of the construction illustrated in Figure 11;

Figure 13 is a sectional view taken on the line 13—13 of Figure 12.

Referring now to the drawings, A is a two-deck four-car carrying trailer provided at its forward end with a stepped portion 1 for attachment to a power driven vehicle such as a truck B, and provided at its rear end with ground-engaging wheels 2 arranged in tandem.

The lower deck 3 of the trailer extends substantially horizontally as at $3^a$ and $3^b$ fore and aft of suitable housings $2^a$ for the wheels 2 and is slightly arched as at $3^c$ between said housings. The upper deck 4 is substantially arcuate in configuration and is provided at its rear end with a hingedly mounted portion 5 which may be raised to permit loading of automobiles upon or unloading of automobiles from the lower deck 3. As shown by dotted lines in Figure 1, two automobiles such as C and D, respectively, may be loaded in the positions indicated upon the lower deck 3, while two automobiles E and F, respectively, may be loaded upon the upper deck 4.

Preferably the ground-engaging wheels 2 are mounted upon stub axles 6 projecting laterally outwardly from walking beams 7 pivoted intermediate their ends upon a transversely extending non-rotatable axle 8 disposed beneath the arched portion $3^c$ of the lower deck and suspended by semi-elliptical leaf springs 9 from suitable sills $3^d$ which carry the lower deck 3. Preferably the axle 8 has a tubular central section 10 and end pieces 11, the latter fitting tightly upon and welded to said section 10 as illustrated in Figure 3. The springs 9 extend through these end pieces 11 upon the inner sides of the walking beams 7 and have lower and upper sections 12 and 13, respectively bolted together midway of their ends. The lower sections 12 constitute the main springs while the upper sections 13 constitute the auxiliary springs. As shown, the end pieces 11 are cored out as at 14 to save weight and have reduced spindle-like end portions 15 upon which the hubs 16 of the walking beams are journaled. Intermediate these spindle-like portions 15 and the tubular central section 10, the end pieces 11 have inverted substantially U-shaped portions 17 that receive the springs 9. Clamps 18 are bolted in recesses 19 in the depending legs 20 of the U-shaped portions and cooperate with said U-shaped portions to form box-like openings 21 for the springs. Preferably the depending legs 20 of the U-shaped portions are provided at their lower ends with inturned portions 22 that not only strengthen the structure but also serve as shields for and protect the clamps 18 against being struck by objects in the road.

The lower sections 12 of the springs are pivoted at their forward ends on pins 23 carried by suitable brackets 24 fixed to slightly arched auxiliary sills 3e, and are slidably mounted at their rear ends in brackets 26 also fastened to the arched auxiliary sills 3e. The upper sections 13 of the springs are shorter than the lower sections 12 and have their opposite ends bearing against suitable brackets 27 fixed to the arched auxiliary sills 3e. To eliminate any shearing action on the spring center bolts 9a which would be caused by the pulling action of the spring leaves, especially the main leaves 9b and leaves thereabove up to the cup washers 9c, I have formed each of the leaves substantially midway of their ends with downwardly opening cup-like portions 9e which fit snugly in one another as shown and take up the pulling action referred to. In this connection it will be noted that the cup-like centers 9e of the uppermost leaves of the springs fit snugly within the cup washers 9c and that the latter are piloted within the portions 17 of the end pieces 11. Thus, in use the main leaves 9b of the main springs which receive the pins 23 are in effect radius rods to keep the tandem wheels in alignment. Actually the pull is through these main leaves 9b and thereafter through each of the cup-like centers 9e, successively through all the leaves of the auxiliary springs 13 up to the cup washers 9c piloted within the portions 17 of the end pieces 11.

In Figures 8 to 10, inclusive, I have illustrated a slight modification in which the end pieces 30 of the axle 31 have upwardly and outwardly inclined portions 32 provided at their upper ends with laterally projecting spindle-like portions 33, and single ground-engaging wheels 34 are mounted on these spindle portions as clearly shown in Figure 9. In this construction tandem wheels such as 2 and walking beams such as 7 have been dispensed with entirely, however the springs 35 extend through the end pieces 30 of the axle 31 between the lower ends of the upwardly inclined portions 32 and the intermediate tubular section 36 of the axle, and are connected to the arched auxiliary sills 3e as in Figure 2.

Thus, in both my preferred and modified constructions the springs extend through the end pieces of the transversely extending non-rotating axle, and the latter is beneath the lower deck as well as below the axes of the ground-engaging wheels of the trailer. As a result, the lower deck of the trailer is much lower to the ground than heretofore. Actually the clearance between the ground and the horizontal portions 3a and 3b of the lower deck is only eight and three-fourths inches, consequently the loading and unloading of such deck is easier and the over-all height of the trailer is at a minimum.

In Figures 11 to 13, inclusive, I have illustrated another modification in which both ends of the leaf springs 9x are slidably mounted in the supporting brackets 24x and 26x, and radius rods 40 are employed. As shown, the radius rods 40 are mounted at their rear ends upon pins 41 carried by forward projections 42 of the end pieces 11 of the axle 8 and are provided at their forward ends with threaded portions 43 that engage threaded openings 44 in brackets 45 swiveled upon pins 46 which in turn are carried by brackets 47 rigid with the undersides of the auxiliary sills 3e. Both the pins 41 and 46 are removable so that adjustments may be made. For instance, the pins 46 at the forward ends of the rods 40 may be removed so that the brackets 45 may be turned about the threaded portions 44 of the rods and then re-assembled with the brackets 47, or the pins 41 may be removed so that the rods 40 may be turned in the brackets 45. Inasmuch as the rods 40 are threaded in the brackets 45 and the latter are swiveled on the transversely extending pins 46, it will be apparent that universal joints have been provided which will compensate for free movement without subjecting the rods to torsional strains. If such threaded connections were eliminated, there would be torsional action in the radius rods caused, for example, from a shifting of the trailer load deflecting the springs more on one side than on the other of the trailer. Moreover, the threaded connections referred to permit an easy adjustment to square up the axle and running gear of the trailer.

What I claim as my invention is:

1. In a vehicle running gear, a longitudinally extending sill, a transversely extending axle having an opening therein, and means for supporting said axle from said sill including a leaf spring extending through said opening, a bolt extending through the leaves of said spring and having an end received within a wall of said opening, and a cup washer on the bolt and piloted within said wall, the leaves of said spring having cup-like portions fitting in one another about the bolt, the cup-like portion of the uppermost leaf fitting within the cup-shaped washer aforesaid.

2. In a spring assembly, a member having a substantially box-like opening therein, and yieldable supporting means for said member including a leaf spring extending through said opening, a bolt extending through the leaves of said spring and having an end received within a wall of said opening, and a cup washer on the bolt and piloted within said wall, the leaves of said spring having cup-like portions fitting in one another about the bolt, the cup-like portion of the uppermost leaf fitting within the cup-shaped washer aforesaid.

3. In a spring assembly, a member having a substantially box-like opening therein, and yieldable supporting means for said member including a leaf spring extending through said opening, a bolt extending through the leaves of said spring and having an end received within a wall of said opening, and a washer on the bolt piloted within said wall, the leaves of said spring having interlocking portions adjacent the bolt, a portion of the uppermost leaf having interlocking engagement with the washer aforesaid.

4. In a vehicle running gear, a longitudinally extending sill, a transversely extending axle having an opening therein, and means for supporting said axle from said sill including a leaf spring extending through said opening, a bolt extending through the leaves of said spring and having an end received within a wall of said opening, and a washer on the bolt piloted within said wall, the leaves of said spring having interlocking portions adjacent the bolt, a portion of the uppermost leaf having interlocking engagement with the washer aforesaid.

5. In a vehicle running gear, a longitudinally extending sill, a transversely extending axle having an opening therein, and means for supporting said axle from said sill including leaf springs extending through said opening, two brackets fixed to said sill at longitudinally spaced points thereof, two other brackets fixed to said sill at spaced points between the brackets just mentioned, a bolt extending through the leaves of said springs and having an end received within a wall of said opening, said springs having upper and lower sections of different length, one end of the lower section being pivotally connected to one of the first mentioned brackets, the other end of said lower section having sliding engagement with the other of said first mentioned brackets, opposite ends of the upper section having sliding engagement with the last mentioned brackets, and a washer on the bolt piloted within the wall aforesaid of said opening, the leaves of said springs having interlocking portions adjacent the bolt, a portion of the uppermost leaf of the upper section having interlocking engagement with said washer.

6. In a vehicle running gear, a longitudinally extending sill, a transversely extending axle beneath said sill and having a transversely extending opening therein, means for supporting said axle from said sill including a leaf spring extending through said opening and having its opposite ends connected to said sill fore and aft of the axle, and a bolt extending through the leaves of said spring and having a head received within a wall of said axle opening for positioning and holding the spring with respect to said axle.

IRVING H. JUDD.